(12) United States Patent
Kume et al.

(10) Patent No.: US 7,713,643 B2
(45) Date of Patent: May 11, 2010

(54) FUEL CELL STACK

(75) Inventors: Hideaki Kume, Susono (JP); Keiji Kishida, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 757 days.

(21) Appl. No.: 10/593,482

(22) PCT Filed: Mar. 24, 2005

(86) PCT No.: PCT/IB2005/000766

§ 371 (c)(1),
(2), (4) Date: Sep. 20, 2006

(87) PCT Pub. No.: WO2005/093884

PCT Pub. Date: Oct. 6, 2005

(65) Prior Publication Data

US 2007/0218331 A1 Sep. 20, 2007

(30) Foreign Application Priority Data

Mar. 25, 2004 (JP) ............................. 2004-089284

(51) Int. Cl.
*H01M 8/04* (2006.01)
*H01M 2/00* (2006.01)

(52) U.S. Cl. .......................................... 429/26; 429/34

(58) Field of Classification Search .................... 429/38
See application file for complete search history.

(56) References Cited

U.S. PATENT DOCUMENTS

| 2002/0076597 A1 | 6/2002 | Chang et al. |
| 2004/0265675 A1* | 12/2004 | Woodcock et al. ............ 429/38 |
| 2005/0084731 A1* | 4/2005 | Nishimura et al. ............ 429/34 |

FOREIGN PATENT DOCUMENTS

| EP | 1 134 830 A2 | 9/2001 |
| JP | A-59-098473 | 6/1984 |
| JP | A 6-60904 | 3/1994 |
| JP | A 7-282835 | 10/1995 |
| JP | A-2005-516353 | 6/2005 |
| WO | WO 03/063286 A1 | 7/2003 |

* cited by examiner

*Primary Examiner*—Patrick Ryan
*Assistant Examiner*—Ashley Kwon
(74) *Attorney, Agent, or Firm*—Oliff & Berridge, PLC

(57) ABSTRACT

A collector plate (14) is connected to an output terminal (16). The collector plate (14) is made such that heat capacity per unit area of a neighboring region (14A) thereof, which is near to a portion where the output terminal (16) is connected, is different to the heat capacity per unit area of other regions (14B, 14C). More specifically, the other regions (14B, 14C) are formed such that the heat capacity per unit area thereof is smaller than that of the neighboring region (14A).

9 Claims, 2 Drawing Sheets

FUEL CELL STACK

BACKGROUND OF THE INVENTION

1. Field of the Invention

The invention relates to a fuel cell stack formed from a plurality of stacked unit cells, and more particularly to a technology that favorably enables the fuel cell stack to be started up more easily at extremely low temperatures below freezing point.

2. Description of the Related Art

A fuel cell is formed with a layered construction in which an electrolyte membrane, such as a solid polymer membrane, is sandwiched between respective electrodes and separators provided on each side of the electrolyte membrane. Normally, a plurality of single unit cells with the above construction are stacked and used as a fuel cell stack. Such a fuel cell stack, as for example disclosed in Japanese Patent Laid-Open Publication Nos. 06-060904 and 07-282835, includes respective collector plates provided at each end of the cell units in a stacking direction thereof. The current generated by each cell is drawn from respective output terminal connected to the collector plates.

However, in the case of a vehicle fuel cell stack used in an electric car or the like, the temperature of the unit cells may potentially drop below freezing point in some usage environments, such as in cold regions. At the cathode of each unit cell, a chemical reaction takes places in which water is generated from hydrogen ions that pass through the electrolyte membrane and oxygen within the oxidation gas. However, when the fuel cell stack is started up below freezing point, the generated water freezes and becomes ice, which obstructs the supply of oxygen to the cathode. As a result, there is a reduction in the voltage of the unit cells. However, heat of reaction is generated at the same time as the water in the above described chemical reaction. Accordingly, if the temperature of the unit cells is raised to above freezing point by this heat of reaction, the ice melts and the supply of oxygen to the cathode is restored.

However, the end unit cells positioned to the outer sides of the fuel cell stack are deprived of a substantial amount of heat by the respective collector plates that have large heat capacity and high thermal conductivity. Accordingly, the temperature rise of these end unit cells is slow as compared to the other unit cells. As a result, even if the other unit cells in the fuel cell stack are generating electricity normally, it is possible that the end unit cells will receive insufficient oxygen due to delayed melting of the ice, which in turn may cause the voltage of the end unit cells to be reduced. It is possible that this reduced voltage of the end unit cells will cause the overall output of the fuel cell stack to be reduced as well. Furthermore, if an abnormal chemical reaction is to occur within the end unit cells in this state, it is possible that (a) the structural material of the end unit cells may be exhausted from the fuel cell stack, or (b) that deterioration of the end unit cells may take place.

Various methods for rapidly increasing the temperature of the end unit cells when the fuel cell stack is started up at low temperature can be suggested such as reducing the plate thickness of the collector plates so as to reduce their heat capacity and inhibit heat radiation from the end unit cells. However, simply reducing the plate thickness of the collector plates in this way is liable to cause an increase in electrical resistance when current is drawn, which may in turn cause battery performance to be impaired by a substantial increase in power loss.

The invention has been conceived of in light of the previously described problems, and aims to provide a solution thereto. It is an object of the invention to provide a fuel cell stack that enables the temperature of end unit cells thereof to be increased rapidly when the fuel cell stack is started up at low temperature, without having any detrimental impact upon battery performance during normal operation.

SUMMARY OF THE INVENTION

In order to achieve the above object, a first aspect of the invention provides a fuel cell stack which is formed from a plurality of stacked unit cells and which includes a collector plate disposed at an end of the stacked unit cells in a stacking direction thereof, and an output terminal for drawing current which is connected to the collector plate. This fuel cell stack is characterised in that the collector plate is made such that a heat capacity per unit area thereof is different for a neighboring region that is near to a portion where the output terminal is connected as compared to other regions. More specifically, the heat capacity per unit area of the other regions is smaller than the heat capacity per unit area of the neighboring region.

According to a second aspect of the invention, the first aspect is further characterised in that the collector plate is made such that a volume per unit area thereof is different for a neighboring region that is near to a portion where the output terminal is connected as compared to other regions. More specifically, the volume per unit area of the other regions is smaller than the volume per unit area of the neighboring region.

According to a third aspect of the invention, the second aspect is further characterised in that the collector plate is less thick in the other regions than in the neighboring region.

According to a fourth aspect of the invention, the second aspect is further characterised in that the collector plate is provided with a plurality of holes formed in the thickness direction of the collector plate. The area of the holes per unit area in the other regions is larger than the area of the holes per unit area of the neighboring region.

According to a fifth aspect of the invention, the fourth aspect of the invention is further characterised in that the diameter of the holes in the other regions is larger than the diameter of the holes in the neighboring region.

According to a sixth aspect of the invention, the fourth aspect of the invention is further characterised in that the number of the holes per unit area of the other regions is larger than the number of the holes per unit area of the neighboring region.

According to a seventh aspect of the invention, the second aspect of the invention further includes an end unit cell having a separator in which gas passages are formed, the separator being integrally formed with the collector plate. In the seventh aspect, the depth or the width of the gas passages of the separator in the other regions are formed to be larger than those of the gas passages in the neighboring region.

According to the first aspect of the invention, the heat capacity of the overall collector plate is reduced by providing regions within the collector plate that have a small heat capacity per unit area. As a result, radiation of heat from the end unit cell to the collector plate is inhibited, which enables the temperature of the end unit cell to be increased more rapidly when the fuel cell stack is started up at low temperature.

According to the second aspect of the invention, the heat capacity of the overall collector plate is reduced by providing regions within the collector plate that have a small volume per unit area. As a result, radiation of heat from the end unit cell to the collector plate is inhibited, which enables the temperature of the end unit cell to be increased more rapidly when the fuel cell stack is started up at low temperature. Moreover, the current density is high in the neighboring region that is near to the portion where the output terminal is connected, whereas the current density is low in the other regions. Accordingly, the volume per unit area of the other regions can be made smaller without causing any significant increase in power loss. As a result, there is no detrimental impact on battery performance during normal operation.

Note that, a structure in which the volume per unit area of the other regions is smaller than the volume per unit area of the neighboring region can be easily realized using configurations in which, for example, (1) the plate is made less thick (as in the third aspect), or (2) the area of the holes per unit area is made larger (as in the fourth aspect). Further, the area of the holes per unit area may be increased using various other methods, such as increasing the number of holes per unit area (as in the sixth aspect) or increasing the size of each hole (as in the fifth aspect).

In addition, if the separator of the end unit cell is formed integrally with the collector plate (as in the seventh aspect), the width or depth of the gas passages of the other regions of the separator can be formed to be larger than those of the gas passages in the neighboring region of the separator. Moreover, even if this configuration is adopted, it is possible to reduce the heat capacity of the area around the end unit cell without causing any significant increase in power loss.

DETAILED DESCRIPTION OF THE PREFERRED EMBODIMENTS

First Embodiment

Hereinafter, a first embodiment of the invention will be explained with reference to FIG. 1.

A fuel cell stack of the invention can be applied, for example, as a vehicle fuel cell stack that is mounted in a vehicle. Of course, it goes without saying that the fuel cell stack of the invention can also be used as a fuel cell stack for other uses.

Figure 1:
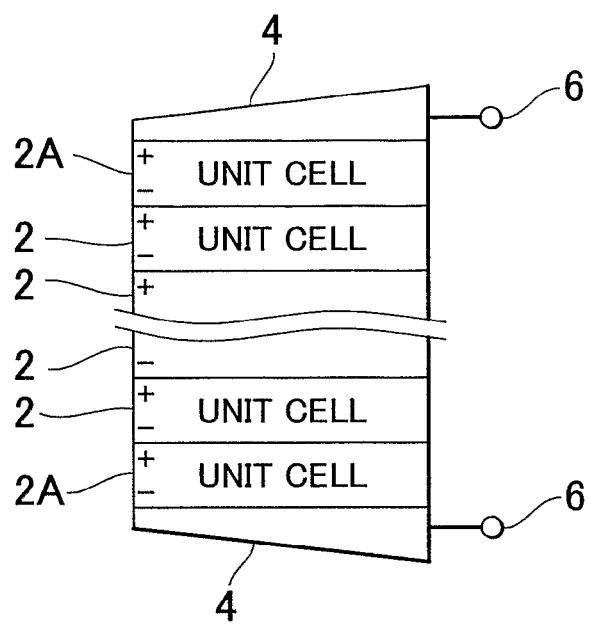
FIG. 1 shows a schematic view of the configuration of a fuel cell stack according to a first embodiment of the invention.

FIG. 1 shows a schematic view of the configuration of the fuel cell stack according to the first embodiment of the invention. As is apparent from FIG. 1, the fuel cell stack is formed from a plurality of unit cells 2 that are stacked in one direction. Each unit cell 2 includes a Membrane Electrode Assembly (MEA) that is formed from an electrolyte membrane, such as a solid polymer membrane, which is sandwiched between respective electrodes provided on each side thereof (these structural elements are not shown in detail in FIG. 1). Further, each unit cell 2 is provided with a pair of separators that are disposed so as to sandwich the MEA from both sides thereof.

Note that, hereinafter, the end unit cells that are positioned at the respective ends of the fuel cell stack in the stacking direction will be referred to as end unit cells 2A, in order to clearly distinguish them from the other unit cells 2.

Collector plates 4 are disposed to the outside of each end unit cell 2A, and respective output terminals 6 are connected to an edge portion of each collector plate 4. These output terminals 6 draw current collected from the unit cells 2 by the collector plates 4 to the outside of the fuel cell stack. In this embodiment, the collector plates 4 are not uniformly thick. Instead, each collector plate 4 is formed to become gradually thinner from the edge portion at which the output terminal 6 is connected toward the edge portion on the opposite side. The plate thickness of the edge portion on output terminal 6 side is substantially the same as that of the collector plates disclosed in related art. However, the plate thickness of the edge portion on the opposite side is thinner than those disclosed in the related art. For example, in the case that the width of the collector plate 4 is approximately 300 mm, and the plate thickness on the output terminal 6 side is 2 mm, the plate thickness on the opposite side is set to about 1 mm.

With the above described configuration, the collector plate 4 is formed so that its thickness varies in different regions. Accordingly, the overall volume of the collector plate 4 is made smaller than that of disclosed collector plates in the related art, whereby it is possible to reduce the overall heat capacity of the collector plate 4. As a result, it is possible to inhibit heat from being radiated from the end unit cells 2A to the collectors 4, which enables the temperature of the end unit cells 2A to be increased rapidly when the fuel cell stack is started up at low temperature. Note that, it is conceivable that making the collector plate 4 less thick will cause power loss to be increased along with a rise in electrical resistance. However, this problem is avoided since the collector plate 4 is not made uniformly thin, but is instead provided with the thickness necessary for respective regions. By ensuring this configuration, it is possible to inhibit the occurrence of power loss. In other words, the current density within the collector plate 4 is (a) high in the region near the portion at which the output terminal 6 is connected, and (b) becomes progressively lower in regions farther from the portion at which the output terminal 6 is connected. However, the configuration ensures that the area of the collector plate 4 where the current density is high is sufficiently thick, as in the disclosed related art. On the other hand, in the regions where the current density is low, namely, where power loss is inherently small, the collector plate 4 is thin. Accordingly, power loss is not significantly increased as is the case with collector plates compared to the related art.

In this embodiment, the collector plates 4 may be uniformly thick instead of varying thickness of the collector plate 4 in different regions, the collector plate may be made such that a heat capacity per unit area thereof is different for a neighboring region that is near to a portion where the output terminal is connected as compared to other regions of the collector plate, and the heat capacity per unit area of the other regions may be smaller than the heat capacity per unit area of the neighboring region. For example, specific heat of the neighboring region material may be smaller than the specific heat of the other regions material.

Given the above described configuration, the fuel cell stack according to the first embodiment of the invention enables the temperature of the end unit cells to be increased rapidly when the fuel cell stack is started up at low temperature, without having any detrimental impact upon battery performance during normal operation.

Second Embodiment

Next, a second embodiment of the invention will be explained with reference to FIG. 2.

Figure 2:
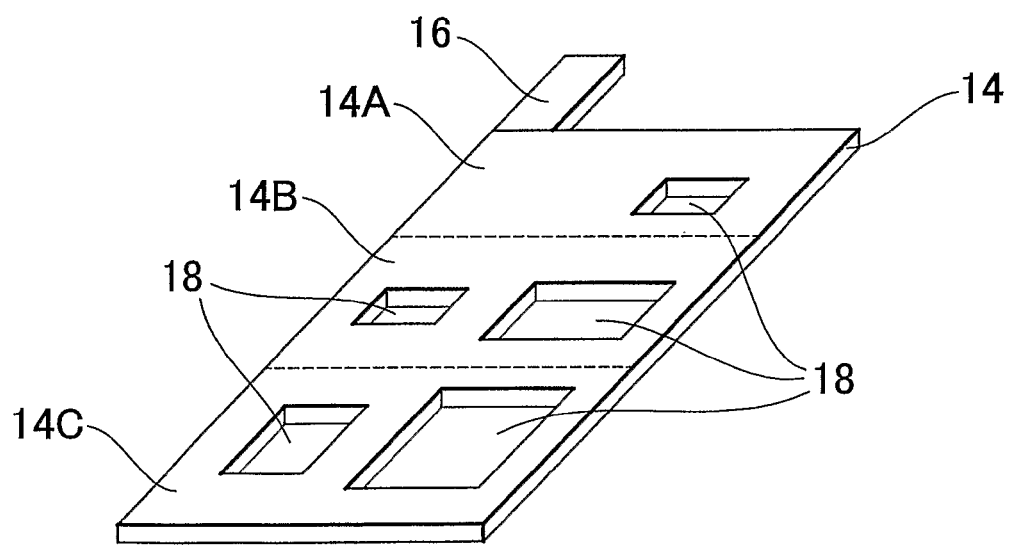
FIG. 2 is a perspective view showing the structure of a collector plate of a fuel cell stack according to a second embodiment of the invention.

FIG. 2 is a perspective view showing the structure of a collector plate 14 of a fuel cell stack according to the second embodiment of the invention. The collector plate 14 may be used instead of the collector plate 4 according to the first embodiment. However, unlike the collector plate 4 of the first embodiment, the plate thickness of the collector plate 14 is the same in all regions. Moreover, a plurality of holes 18 are formed in the surface of the collector plate 14. These holes 18 penetrate all the way through the collector plate 14 in the thickness direction thereof. The positions and sizes of the holes 18 in the collector plate 14 are determined such that the area of the holes per unit area of each region of the collector plate 14 becomes larger farther away from the portion at which the output terminal 16 is connected. For example, the collector plate 14 may be hypothetically divided into three regions, namely, regions 14A, 14B and 14C, as shown in FIG. 2. A small one of the holes 18 is provided in the region 14A, which is a neighboring region near to the portion where the output terminal 16 is connected, and, in contrast to this, a large and a small one of the holes 18 are provided in the regions 14B and 14C, which are the other regions that are farther from the output terminal 16. Moreover, the holes 18 that are provided in the two regions 14B and 14C that are far from the output terminal 16 are formed such that the holes 18 in the region 14C, which is further away from the out put terminal 16 as compared to the region 14B, are larger than those provided in the region 14B.

With the above described configuration, providing the plurality of holes 18 in the collector plate 14 enables the overall volume of the collector plate 14 to be reduced as compared to collector plates disclosed in the related art. As a result, it is possible to reduce the overall heat capacity of the collector plate 14. Furthermore, the area of the holes per unit area of the region 14A near to the output terminal 16 with high current density is small, and the area of the holes per unit area of the regions 14B and 14C far from the output terminal 16 with low current density is large. Accordingly, the holes 18 can be provided whilst also ensuring that no substantial increase in power loss is caused thereby.

Given the above described configuration, the fuel cell stack according to the second embodiment of the invention, like that of the first embodiment, enables the temperature of the end unit cells to be increased rapidly when the fuel cell stack is started up at low temperature, without having any detrimental impact upon battery performance during normal operation. Moreover, the collector plate 14 can be manufactured easily by forming the holes 18 in a plate with uniform thickness. Accordingly, this manufacturing method is advantageous as compared to that used for the first embodiment, where the collector plate 4 has to be manufactured to have varying thickness.

Third Embodiment

Next, a third embodiment of the invention will be described with reference to FIG. 3.

Figure 3:
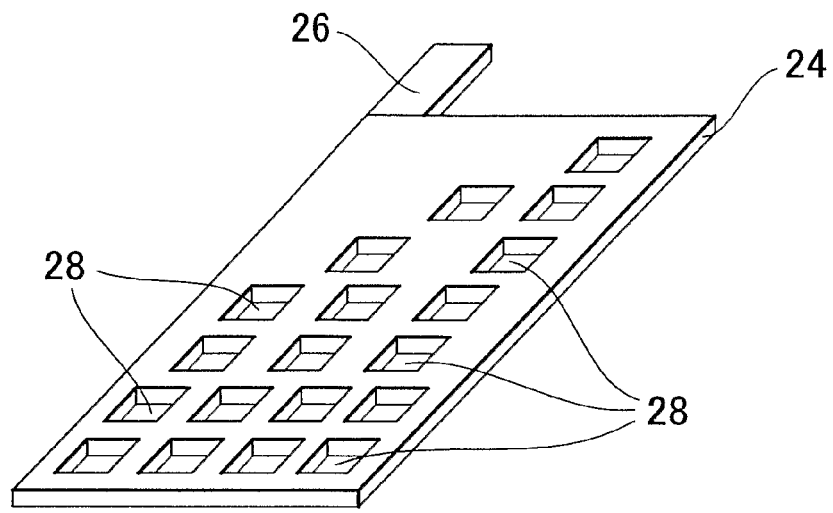
FIG. 3 is a perspective view showing the structure of a collector plate of a fuel cell stack according to a third embodiment of the invention.

FIG. 3 is a perspective view showing the structure of a collector plate 24 of a fuel cell stack according to the third embodiment of the invention. The collector plate 24 may be used instead of the collector plate 4 according to the first embodiment. The collector plate 24, like the collector plate 14 according to the second embodiment, is provided with a plurality of holes 18 in its surface. These holes 18 penetrate all the way through the collector plate 24 in the thickness direction thereof. Further, the area of the holes per unit area of the various regions of the collector plate 24 are set to be different. However, the key difference from the second embodiment is that, in the third embodiment, all of the holes 28 are the same size, and the difference in the area of the holes per unit area is realized by varying the number of the holes 28 in each region. More specifically, in the neighboring region near to the portion where the output terminal 26 is connected there are few holes 28, whereas in the regions farther from the output terminal 26 there are many holes 28. As a result of adopting this configuration, it is possible to realize the same effects as the second embodiment.

Other Modified Forms

Hereinabove, various embodiments of the invention have been described. However, the invention is in no way limited to these embodiments, and may be realized in various other modified forms that remain within the scope of the spirit of the invention. The following examples illustrate just a few of these other possible forms.

In the above described embodiments, the volume per unit area of the collector plate is varied in either a continuous smooth manner (in the first embodiment) or a step-like manner (in the second and third embodiments) along with distance from the portion at which the output terminal is connected. However, any configuration may be utilized so long as it is ensured that the volume per unit area of the neighboring region near to the portion where the output terminal is connected is sufficient. For example, the volume per unit area of both of the other regions may be reduced to the same extent. It should be noted that the current density within the collector plate increases dramatically in the neighboring region near to the portion where the output terminal is connected. Thus, so long as it is ensured that the volume per unit area of this neighboring region is sufficient, even if the volume per unit area of the other regions is reduced equally, there is no likelihood that power loss will increase significantly.

Figure 4:
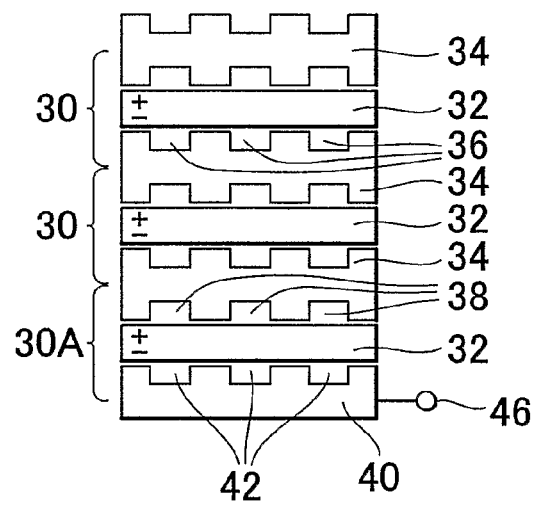
FIG. 4 shows a schematic view of the configuration of a fuel cell stack according to a modified form of the invention.

Moreover, FIG. 4 shows a schematic view of the configuration of a modified form of a fuel cell stack which may be applied to any of the above embodiments. In this modified form, the unit cells 30 (excluding the end unit cells 30A) are formed from an MEA 32 that is sandwiched from each side by respective separators 34. Each separator 34 is shared by neighboring unit cells 30. A plurality of gas passages 36 and 38 for supplying reaction gas are formed in the respective surfaces of each separator 34 that are in contact with the MEAs 32. The gas passages 36 formed in the surface on the anode side of each separator 34 are passages for supplying fuel gas, and the gas passages 38 formed on the cathode side are for supplying oxidation gas.

Each end unit cell 30A (unlike the other unit cells 30) is configured such that the MEA 32 is sandwiched between one of the separators 34 that is disposed to the inside (namely, the side toward the center of the fuel cell stack), and a collector plate 40 that is disposed to the outside. The collector plate 40 is connected to an output terminal 46. In other words, with the end unit cells 30A according to this modified form, the separator that is positioned to the outside of the MEA 32 in the related art is omitted, and the collector plate 40 performs the function of the separator instead. Accordingly, a plurality of gas passages 42 for supplying gas to the MEA 32 are formed in the collector plate 40. In FIG. 4, the shown MEA 32 is disposed on the anode side, and thus the gas passages 42 supply fuel gas. It should be noted that copper, which excels in terms of electrical conductivity, is utilized as the material of the collector plate 40, and the gas passages 42 are gold plated in order to improve their corrosion resistance.

According to this modified form of the invention, it is possible to reduce the heat capacity of the area around the end unit cell 30A by integrating the collector plate 40 and the separator that may normally be provided to the outside of each end unit cell 30A. Accordingly, radiation of heat from the end unit cells 30A is inhibited, and it is possible to more rapidly increase the temperature of the end unit cells 30A when the fuel cell stack is started up at low temperature.

Figure 5:
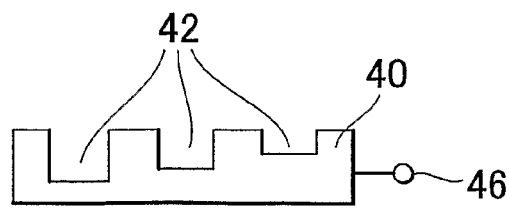
FIG. 5 shows a schematic view of the structure of a collector plate of the fuel cell stack according to the modified form of the invention.

Moreover, with the above described modified form, as is illustrated in FIG. 5, it is possible to form the gas passages 42 such that their depth or width is different in the regions far from the output terminal 46 as compared to the neighboring region near to the portion where output terminal 46 is connected. More specifically, the depth or width of the gas passages 42 may be set such that the volume per unit area of the collector plate 40 becomes progressively smaller in regions that are farther from the portion where the output terminal 46 is connected. By adopting this configuration, it is possible to make the heat capacity of the area around the end units cells 30A smaller without causing a significant increase in power loss.

The invention claimed is:

1. A fuel cell stack comprising:
a plurality of stacked unit cells;
a collector plate disposed at an end of the stacked unit cells in a stacking direction thereof; and
an output terminal for drawing current which is connected to the collector plate, wherein in that
the collector plate is made such that a heat capacity per unit area thereof is different for a neighboring region that is near to a portion where the output terminal is connected as compared to other regions of the collector plate, the heat capacity per unit area of the other regions is smaller than the heat capacity per unit area of the neighboring region, and current density of the other regions is smaller than current density of the neighboring region.

2. The fuel cell stack according to claim 1, wherein
the collector plate is made such that a volume per unit area thereof is different for a neighboring region that is near to a portion where the output terminal is connected as compared to other regions of the collector plate, and the volume per unit area of the other regions is smaller than the volume per unit area of the neighboring region.

3. The fuel cell stack according to claim 2, wherein
the collector plate is less thick in the other regions than in the neighboring region.

4. The fuel cell stack according to claim 2, wherein
the collector plate is provided with a plurality of holes formed in the thickness direction of the collector plate, and the area of the holes per unit area of the collector plate in the other regions is larger than the area of the holes per unit area in the neighboring region.

5. The fuel cell stack according to claim 4, wherein
the diameter of the holes in the other regions is larger than the diameter of the holes in the neighboring region.

6. The fuel cell stack according to claim 4, wherein
the number of the holes per unit area in the other regions is larger than the number of the holes per unit area in the neighboring region.

7. The fuel cell stack according to claim 2, further comprising:
an end unit cell including a separator in which gas passages are formed, the separator being integrally formed with the collector plate, wherein
at least one of a depth and a width of the gas passages in the other regions of the separator are formed to be larger than a corresponding one of a depth and a width of the gas passages in the neighboring region of the separator.

8. The fuel cell stack according to claim 1, wherein
gas passages are formed in the collector plate.

9. The fuel stack according to claim 8, wherein
the collector plate is made of copper and the gas passages are gold plated.

* * * * *